US010013464B2

(12) United States Patent
Dawson et al.

(10) Patent No.: US 10,013,464 B2
(45) Date of Patent: Jul. 3, 2018

(54) LOCATING AND RANKING INDIVIDUALS USING SOCIAL MEDIA ANALYTICS

(71) Applicant: International Business Machines Corporation, Armonk, NY (US)

(72) Inventors: Christopher J. Dawson, Arlington, VA (US); Randy S. Johnson, O'Fallon, MO (US); Tedrick N. Northway, Wood River, IL (US); William A. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 14/702,943

(22) Filed: May 4, 2015

(65) Prior Publication Data

US 2016/0328400 A1 Nov. 10, 2016

(51) Int. Cl.
*G06F 17/30* (2006.01)
*G06Q 10/06* (2012.01)
*G06Q 50/00* (2012.01)

(52) U.S. Cl.
CPC .... *G06F 17/3053* (2013.01); *G06F 17/30867* (2013.01); *G06Q 10/063112* (2013.01); *G06Q 50/01* (2013.01)

(58) Field of Classification Search
CPC ............................ G06F 17/30; G06F 17/30861
See application file for complete search history.

(56) References Cited

U.S. PATENT DOCUMENTS

| | | | |
|---|---|---|---|
| 6,249,715 B1 * | 6/2001 | Yuri | G06Q 10/04 700/108 |
| 7,689,537 B2 | 3/2010 | Goodwin et al. | |
| 8,380,655 B2 | 2/2013 | Nevin et al. | |
| 8,457,979 B2 | 6/2013 | Kurtzig et al. | |
| 8,538,955 B2 | 9/2013 | Hu et al. | |
| 8,577,834 B2 | 11/2013 | Chen et al. | |
| 8,954,500 B2 | 2/2015 | Marlow et al. | |
| 2002/0128885 A1* | 9/2002 | Evans | G06Q 10/06 705/7.29 |
| 2005/0071241 A1* | 3/2005 | Flockhart | G06Q 30/0601 705/26.1 |

(Continued)

FOREIGN PATENT DOCUMENTS

CN 103309957 A 9/2013

OTHER PUBLICATIONS

Li et al.; "A Service Mode of Expert Finding in Social Network"; 2013 International Conference on Service Science; Shenzhen, China; Apr. 11-13, 2013; pp. 220-223; IEEE.

*Primary Examiner* — Rehana Perveen
*Assistant Examiner* — Huen Wong
(74) *Attorney, Agent, or Firm* — Alexa L. Ashworth; A. Imtiaz Billah (57) ABSTRACT

Embodiments of the present invention provide systems and methods for finding individuals within a field. In one embodiment, a configured query is utilized in order to identify a set of appropriate individuals within a field. Information associated with a skill level and a relationship of a requester is found across a set of disparate media outlets. The system assigns a level of skill set and level of relationship of any identified individual to the requester. A ranking of the identified individuals is generated based on the skill set and relationship of any identified individual based on the configured query.

20 Claims, 4 Drawing Sheets

(56) References Cited

U.S. PATENT DOCUMENTS

| | | | |
|---|---|---|---|
| 2005/0223354 A1* | 10/2005 | Drissi | G06F 8/36 |
| | | | 717/114 |
| 2010/0174712 A1 | 7/2010 | Li et al. | |
| 2010/0262610 A1 | 10/2010 | Acosta et al. | |
| 2011/0153597 A1 | 6/2011 | Christensen et al. | |
| 2011/0238591 A1* | 9/2011 | Kerr | G06Q 10/06 |
| | | | 705/321 |
| 2011/0252022 A1* | 10/2011 | Panchadsaram | G06F 17/3087 |
| | | | 707/723 |
| 2012/0259806 A1* | 10/2012 | Balabaskaran | G06Q 10/109 |
| | | | 706/47 |
| 2013/0124268 A1 | 5/2013 | Hatton et al. | |
| 2014/0089216 A1* | 3/2014 | Costa | G06Q 10/105 |
| | | | 705/319 |
| 2014/0095399 A1* | 4/2014 | Smith | G06Q 10/1053 |
| | | | 705/321 |
| 2014/0172729 A1 | 6/2014 | Chakraborty et al. | |
| 2014/0244531 A1 | 8/2014 | Baldwin et al. | |
| 2014/0258161 A1* | 9/2014 | Brown | G06Q 10/1053 |
| | | | 705/321 |
| 2015/0286990 A1* | 10/2015 | Adair | G06Q 10/1053 |
| | | | 705/319 |

\* cited by examiner

LOCATING AND RANKING INDIVIDUALS USING SOCIAL MEDIA ANALYTICS

BACKGROUND OF THE INVENTION

The present invention relates generally to the field of information analytics and more specifically to searching and analyzing various social media platforms using social media analytics to identify one or more individuals from a particular field having a requested skill set.

Businesses often search for skill sets in various fields, for example, engineering, consulting, or accounting, using social media. Social media is a group of Internet-based applications allowing for user-generated content to be utilized by others. Business networking applications, social networks, communication dashboards, and discussion boards are some of the examples of the different types of social media. Other types of social media exist, making the information contained within social media disparate, extensive, and vast. Businesses may often spend a lot of time searching through the disparate social media outlets in order to locate an appropriate individual with the requested skill set.

SUMMARY

According to one embodiment of the present invention, a method for locating individuals in a field is provided, the method comprising the steps of: receiving, from a requester, a query, wherein the query comprises at least one important skill set; identifying, by one or more processors, at least one of a plurality of individuals associated with the at least one important skill set, using at least one type of media; identifying, by one or more processors, a relationship of the at least one of the plurality of individuals associated with the at least one important skill set to the requester, using at least one type of media; identifying, by one or more processors, a level of the at least one important skill set of the at least one of the plurality of individuals and a level of the relationship of the at least one of the plurality of individuals to the requester; and generating, by one or more processors, a ranking of the plurality of individuals based on a predetermined relationship criteria and a predetermined skill set criteria.

Another embodiment of the present invention provides a computer program product for locating individuals in a field, based on the method described above.

Another embodiment of the present invention provides a computer system for locating individuals in a field, based on the method described above.

DETAILED DESCRIPTION

Businesses often require the services of outside individuals in order to complete projects. These individuals may have a requested skill set needed to complete these projects. Social media serves as a repository of information that can be accessed by seeking the requested skill set from outside individuals. Searching through the voluminous amounts of information contained across the disparate forms of social media, in order to find the necessary information needed to find the appropriate individuals, can be a very time consuming task. Aside from the desired skills, requestors often try to find people with those that they have a social connection. The interplay between the more objective criterion of the requested skill set and the subjective criterion of the social connections is another consideration for the requestors. Embodiments of the present invention provide systems and methods for searching social media in order to find and rank individuals, based on various social connections and on a set of requested skills.

Figure 1:
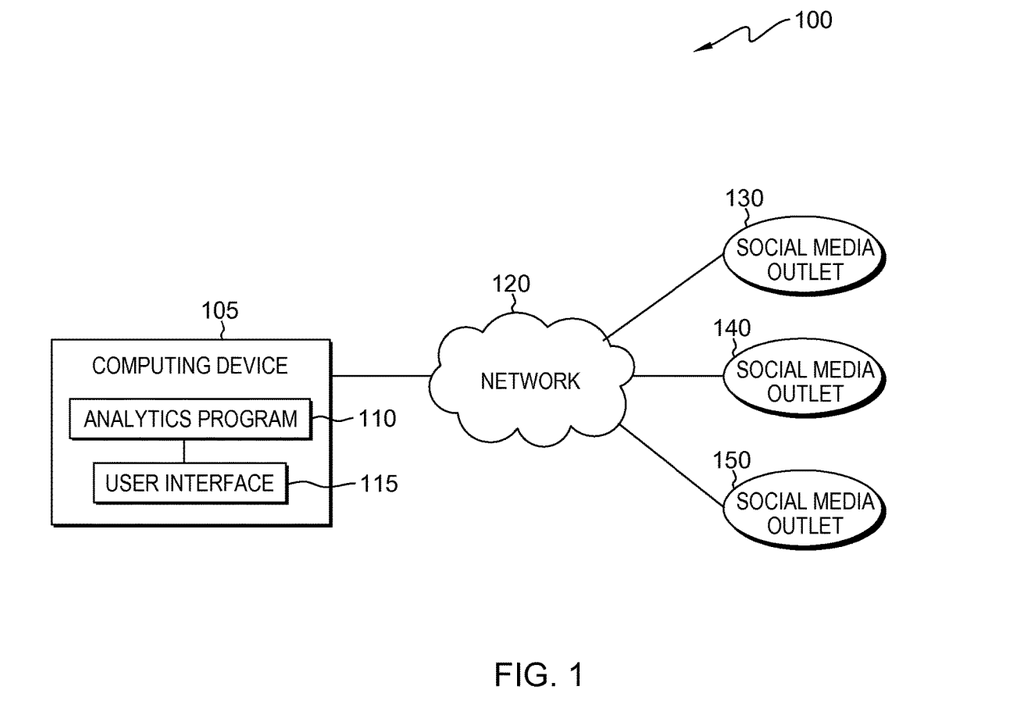
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes social media outlets 130, 140, and 150 and computing device 105, interconnected via network 120. Other combinations and permutations of social media outlets are possible for this invention.

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 105 and social media outlets 130, 140, and 150.

Social media outlets 130, 140, 150 are computer-mediated tools that allow users to generate content that can be shared with others across a network. Social media outlets 130, 140, and 150 may be business networking applications, social networks, communication dashboards, and discussion boards, among other outlets. Social media outlets 130, 140, and 150 can communicate with any additional programmable electronic devices not pictured in FIG. 1 via network 120. Data processing environment 100 may include any number of social media outlets that can be supported by the system.

Computing device 105 includes analytics program 110 and user interface (UI) 115. Computing device 105 may be a laptop computer, a tablet computer, a netbook computer, a personal computer (PC), a desktop computer, a personal digital assistant (PDA), a smart phone, a thin client, or any programmable electronic device capable of communicating with social media outlets 130, 140, and 150 via network 120. Computing device 105 may include internal and external hardware components, as depicted and described in further detail with respect to FIG. 4.

UI 115 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. UI 115 is capable of receiving data, user commands, and data input modifications from a user and social media outlets 130, 140, and 150. UI 115 is also capable of communicating with analytics program 110. In some embodiments, UI 115 may be integrated with analytics program 110.

In this exemplary embodiment, analytics program 110 is an application capable of searching multiple social media outlets via searching analytics. The analytics can be configured by the requestor, in order to find individuals and the social connections between the individual and the requestor. Analytics program 110 compiles the information found using social media analytics. A simple algorithm is used by analytics program 110 to determine the rankings of the individuals list based on the skills of the individuals, the social connections to the requestor, and a weighted ranking taking into account the skills of the individual and the social connections to the requestor. The weighted ranking can be configured by assigning any level of preference to the skill set and the social connection, including assigning the same level of preference. After compiling the different rankings, analytics program 110 outputs the rankings to the requestor.

Figure 2:
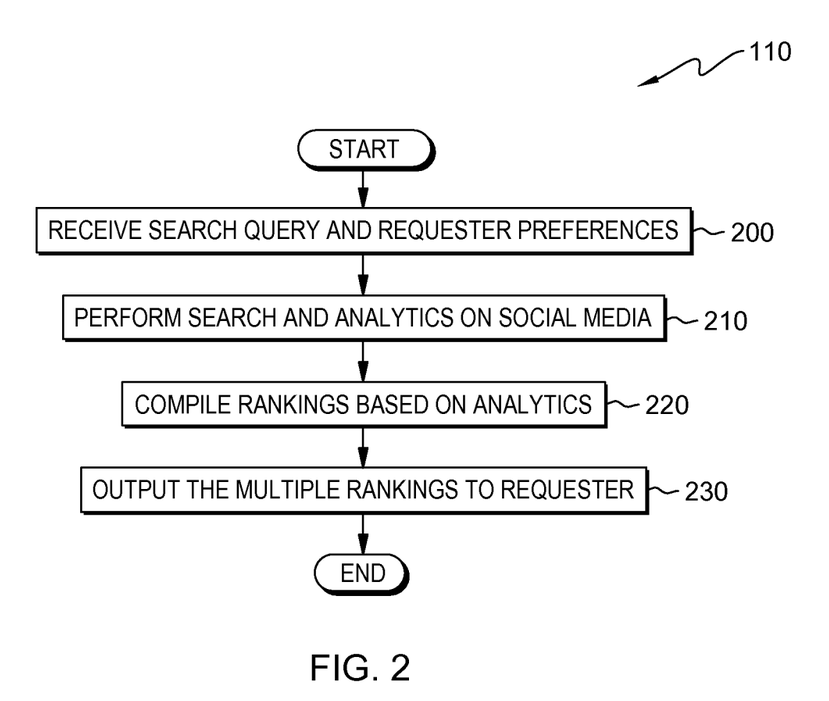
FIG. 2 is a flowchart depicting operational steps for generating a ranking of individuals found using analytics, in accordance with an embodiment of the present invention.

FIG. 2 is a flowchart depicting operational steps of analytics program 110 for generating a ranking of individuals found using analytics, in accordance with an embodiment of the present invention.

In step 200, analytics program 110 receives a search query and preferences from a requestor. In this exemplary embodiment, analytics program 110 receives a skill set request from a requestor. The requestor configures analytics program 110 in order to conduct a search across social media outlets, in order to find individuals with the requested skill set. The requestor may enter search terms, which consist of a skill within a scope. For example, a requestor (e.g., a photonics company) requests electrical engineering skills, including circuit design experience. The scope is not restricted to just technical terms and can be defined in other terms, such as a geographic boundary. For example, the requestor may request an electrical engineer working in Broome County, N.Y. The requestor may also specify preferences for certain social media outlets. For example, a requestor may have a strong preference for LinkedIn® over Twitter®, as LinkedIn® compiles business networking and working professionals. Analytics program 110 allows the user to choose to weigh the skill set over the social connections, weigh the social connections over the skill set, or equally weigh the skill set to the social connections in order to generate a ranking of the individuals found from the search. For example, a requestor may prefer to work with others connected through social interactions/associations, having the requested skill set. For example, analytics program 110 may be configured to factor 70% toward the social connection to the requestor, and factor 30% to the skill set of the individual, when calculating a ranked output.

In step 210, analytics program 110 performs searches and analytics on social media outlets. In this exemplary embodiment, analytics program 110 uses the configured search query, which takes into account skill sets desired by a requestor within a scope and user preferences for certain social media. Analytics program 110 mines through social media outlets in order to find the individuals which most closely match the requestor's search query. For example, analytics program 110 may search IBM Expertise Locator®, job titles, associations, global position systems (GPS) data feeds, and other venues within social media outlets, in order to find individuals with the requested skill set(s). Analytics program 110, which finds individuals, performs further analytics on social media outlets, to determine if there is a social connection between each of the individuals found in the search, and the requestor. For example, analytics program 110 may search email and messaging feeds; forums; blogs; associations; and other social media outlet feeds, in order determine the nature of the social connection between each individual found in the search and the requestor. If the search of social media outlets cannot establish a connection between an individual and a requestor, then analytics program 110 determines that there is no social connection between the individual and the requestor. In other embodiments, analytics program 110 may bring to the attention of a requestor that there is a social connection between an individual and the requestor, which was previously unknown to the requestor. For example, communication between people within the confines of social media outlets, such as blogs, are often anonymous and these people do not know the identities of the other people with whom they are communicating with. For example, analytics program 110 may find four individuals as a result of a requested search, however, the requestor may not know prior to the search that each of the four individuals are members of the same blog.

In step 220, analytics program 110 compiles rankings based on the analytics performed. In this exemplary embodiment, analytics program 110 obtains credentials of each individual found from the search conducted across the different platforms of social media outlets, in order to make a profile for each individual. For example, the credentials of the individual may include degrees obtained, memberships in professional organizations, complaints, accolades, etc., in order to establish an individual's "skill-level." In this exemplary embodiment, the credentials are obtained from social media outlets. For example, an engineer has excellent recommendations from his past supervisors in a business networking application for being persistent and cordial. In a separate social media outlet, which provides feedback on professional engineers, another engineer has poor ratings for professionalism, as clients complained that the engineer responds slowly to the clients' questions. Thus, the engineer's credentials profile includes the "positive" recommendations from his past supervisors and "negative" feedback from his past clients. Analytics program 110 generates a ranking using an algorithm which calculates all the credentials in the profile of the individual and the configured preferences of the requestor. The compilation of the calculated rankings based on skill set are described in further detail with respect to FIG. 3A and FIG. 3B.

How the algorithm is configured plays a crucial role in ranking the requested skill set. In this exemplary embodiment, the social connections amongst the individuals found and the requestor are also included in the profile of the requestor. Information regarding credentials is gathered from social media outlets to form a separate profile for each individual found. For example, the requestor may prefer engineers who are members of the same business networking social media and those who post in the same blogs as the requestor. In this exemplary embodiment, analytics program 110 can determine the nature of the social connections between the individual and the requestor and can create a profile compiling the connections between the individual and the requestor, by overcoming the disparate nature of social media in order to establish a profile for each individual. The compilation of the calculated rankings based on the nature of the social connections between individuals found and the requestor are described in further detail with respect to FIG. 3A and FIG. 3D.

In this exemplary embodiment, a weighted ranking may be generated by analytics program 110. The weighted ranking considers information associated with credentials relevant to the requested skill set in conjunction with the nature of the social connection. For example, some requestors may prefer to work with those they are more familiar with, while other requestors may primarily prefer the highest skill set level. For example, analytics program 110 calculates a weighted ranking, in which the requestor strongly prefers to work with individuals he is familiar with (i.e., 90% for the social connection and 10% for the requested skill set). If analytics program 110 calculates a weighted ranking, in which the requestor strongly prefers highest skill set level over familiarity (i.e., 90% for the requested skill set and 10% for the social connection), the ranking may be different. Weighted rankings are described in more detail with respect to FIG. 3C.

In step 230, analytics program 110 outputs the rankings to the requestor. After analytics program 110 compiles the information of the individuals found, a ranking based on level of the requested skill-level, level of the social connection to the requestor; or the level of the requested skill set in conjunction with the social connection to the requestor, is calculated and displayed to the requester. In this exemplary embodiment, analytics program 110 outputs the ranking(s) based on the preferences of the requestor (e.g., the requester may prefer a certain weight to be given to social connections and a certain weight to be given to the requested skill set).

Figure 3A:
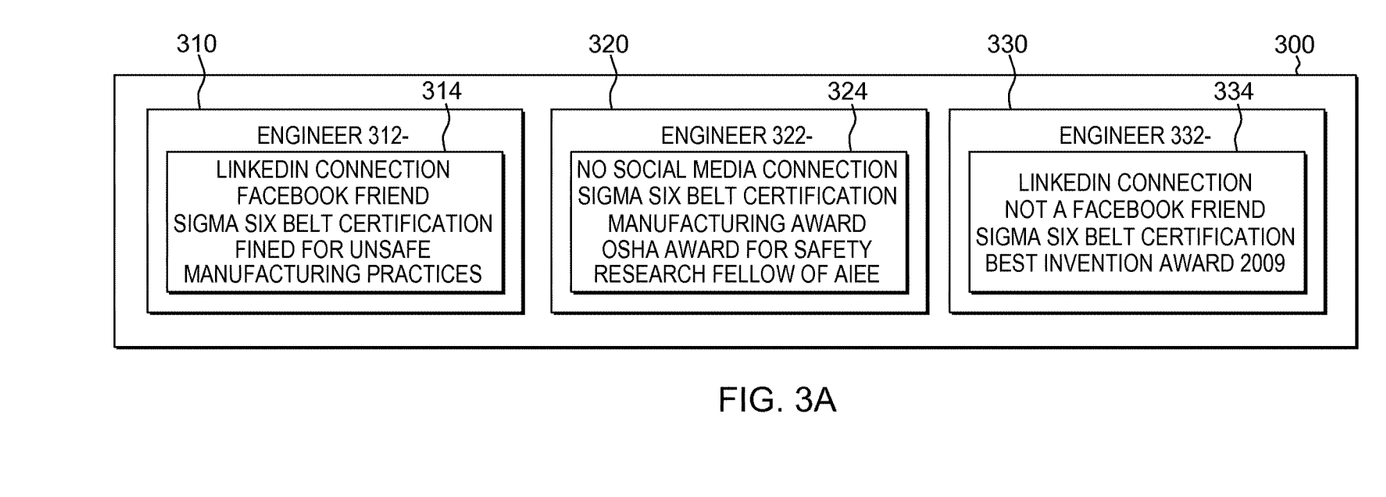
FIG. 3A is an example of a compilation of information associated with individuals found after searching and performing analytics on social media outlets, in accordance with an embodiment of the present invention.

FIG. 3A is an example of compilation of information associated with individuals found after searching and performing analytics on social media outlets, in accordance with an embodiment of the present invention.

Analytics program 110 receives a search query from a requestor and compiles the information associated with individuals found after performing analytics on disparate social media (step 220 of FIG. 2). In this exemplary embodiment, compilation 300 contains profiles 310, 320, and 330 for three individuals—engineer 312, engineer 322, and engineer 332, respectively. Profiles 310, 320, and 330 include attributes 314, 324, and 334, respectively. Attributes 314, 324, and 334 include information relevant to the skill set and the social connections of engineer 312, engineer 322, and engineer 332, respectively, to the requester. For example, attributes 314 relevant to the skill set of engineer 312 are the "sigma six belt certification" and a "fine for unsafe manufacturing practices". Attributes 314 relevant to the social connection between the requestor and engineer 312 include being "LinkedIn® connections" and "Facebook® friends".

Figure 3B:
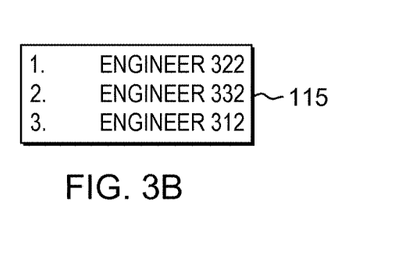
FIG. 3B is an example of a user interface depicting a generated output based on skill level, in accordance with an embodiment of the present invention.

FIG. 3B is an example of user interface 115, depicting a generated output based on skill level, in accordance with an embodiment of the present invention.

In this exemplary embodiment, the requestor may prefer to generate a ranking based only on skill level (step 230 of FIG. 2), thus certain credentials, such as professional affiliations and trade awards, may be given high importance when calculating the ranking. For example, from attributes 314, 324, and 334 associated with engineers 312, 322, and 332, respectively, engineer 322 has sigma six belt certification, a manufacturing award, OSHA safety award, and is a research fellow. Engineer 312 also has sigma six belt certification, but has been fined for unsafe manufacturing practices and has received no awards. Engineer 332 has sigma six belt certification and won a Best Invention Award. Engineer 312 has not won any awards and thus compared to engineer 322 and engineer 332, analytics program 110 may find that engineer 312 is the least skilled for the requested engineering skills. Engineer 322 has won more awards than engineer 332 and thus compared to engineer 312 and engineer 332, analytics program 110 finds that engineer 322 is the most skilled. Based on these findings, analytics program 110 outputs the individuals with engineer 322 first (i.e., most relative experience for the requested skills), engineer 332 second (i.e., moderate relative experience for the requested skills), and engineer 312 third (i.e., least relative experience for the requested skills).

Figure 3C:
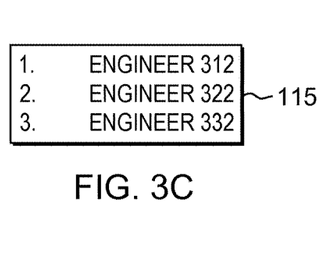
FIG. 3C is an example of a user interface depicting a generated output based on weighted rank, in accordance with an embodiment of the present invention.

FIG. 3C is an example of user interface 115 depicting a generated output based on weighted rank, in accordance with an embodiment of the present invention.

In this exemplary embodiment, the requestor may request a weighted ranking incorporating the two factors of skill level and the social connection of the individual to the requestor (step 230 of FIG. 2). The algorithm (as configured by the requestor) for a weighted ranking may favor the social connection of the individual to the requestor over skill set or favor skill set over the social connections of the individual to the requestor. For example, from attributes 314, 324, and 334 associated with engineers 312, 322, and 332, respectively, engineer 312 has the most social connections to the requestor (i.e., "LinkedIn connection" and "Facebook friend"), while engineer 322 appears to have the least social connections to the requestor (i.e., "no social media connection"). Engineer 322 has the highest overall skill set (i.e., "sigma six belt certification", "manufacturing award", "OSHA award for safety", and "research fellow of AIEE"), while engineer 312 has the least overall skill set (i.e., "sigma six belt certification" and "fined for unsafe manufacturing practices"). Based on these findings, analytics program 110 outputs the individuals with engineer 312 first (i.e., highest relative weighted ranking), engineer 322 second (i.e., moderate relative weighted ranking), and engineer 332 third (i.e., least relative weighted ranking). If the requestor has a strong preference for individuals with skill level over the social connection of the individual to the requestor, the weighted ranking may be different.

Figure 3D:
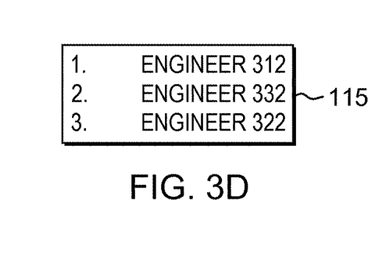
FIG. 3D is an example of a user interface depicting a generated output based on the social connections to the requestor, in accordance with an embodiment of the present invention.

FIG. 3D is an example of user interface 115 depicting a generated output based on the social connections to the requestor, in accordance with an embodiment of the present invention.

In this exemplary embodiment, the requestor may prefer to generate a ranking based only on the social connections to the requestor (step 230 in FIG. 2), thus certain connections, such as being a member of the same business networking application and online social networking application, may be given high importance when calculating the ranking. For example, from attributes 314, 324, and 334 associated with engineers 312, 322, and 332, respectively, engineer 312 is a LinkedIn connection to the requestor and Facebook friend of the requestor. Engineer 332 also is a LinkedIn connection to the requestor. Engineer 322 has no social connections to the requestor. As a result, engineer 312 has two forms of connection to the requestor; engineer 322 has no connection to the requestor; and engineer 332 has one form of connection to the requestor. Based on these findings, analytics program 110 outputs the individuals with engineer 312 first (i.e., most relative social connections to the requestor), engineer 332 second (i.e., moderate relative social connections to the requestor), and engineer 322 third (i.e., least relative social connections to the requestor). Had the algorithm been configured differently by holding certain social media as a disqualification, such as Facebook, then analytics program 110 may output engineer 332 first (i.e., most relative social connections to the requestor), engineer 312 second (i.e., moderate relative social connections to the requestor), and engineer 322 third (i.e., least relative social connections to the requestor).

Figure 4:
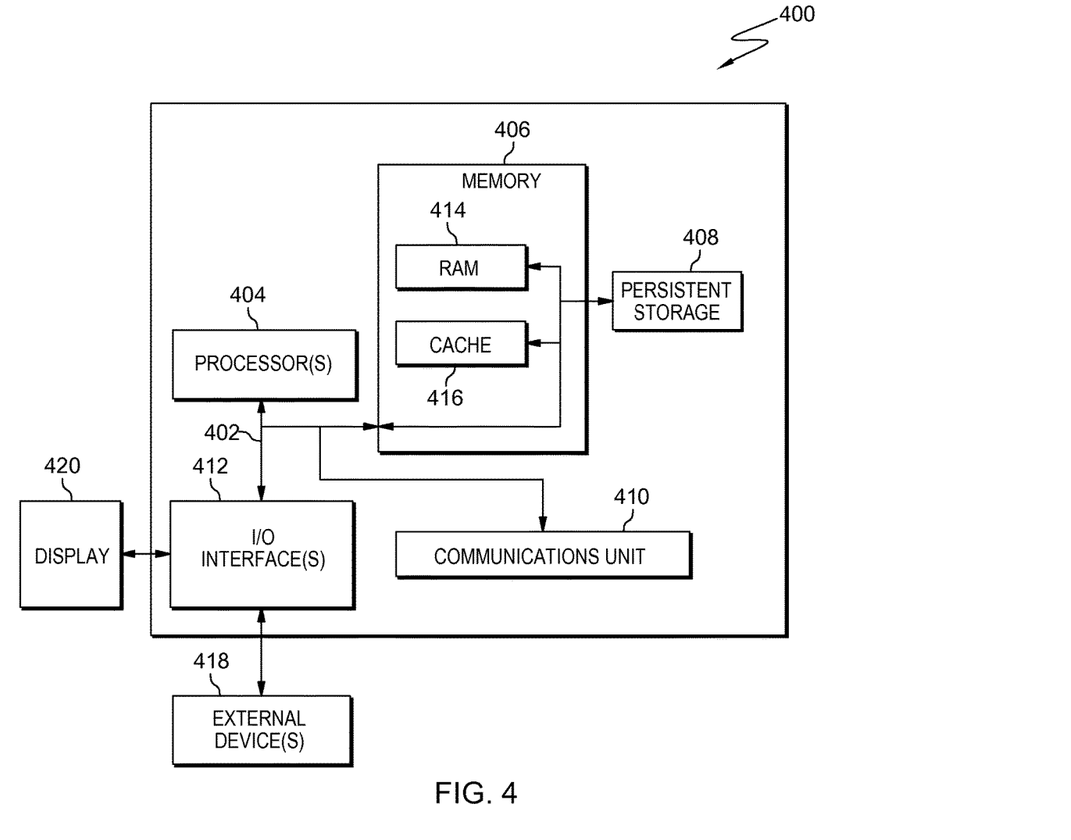
FIG. 4 depicts a block diagram of internal and external components of a data processing system, such as the computing device of FIG. 1, in accordance with an embodiment of the present invention.

FIG. 4 depicts a block diagram of components of computing device 105 and social media outlets 130, 140, and 150, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 105, social media outlets 130, 140, and 150 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Analytics program 110 in computing device 105 is stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including between computing device 105 and social media outlets 130, 140, and 150. In these examples, communications unit 410 includes one or more network interface cards. Communications unit 410 may provide communications through the use of either or both physical and wireless communications links. The program's user interface 115 and analytics program 110 in computing device 105 may be downloaded to persistent storage 408 through communications unit 410.

I/O interface(s) 412 allows for input and output of data with other devices that may be connected to computing device 105 and social media outlets 130, 140, and 150. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program's user interface 115 and analytics program 110 in computing device 105 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for locating individuals in a field, the method comprising the steps of:

receiving, from a requester, a query, wherein the query comprises at least one important skill set;

associating, by one or more processors, the query with a plurality of preferences of the requester, a predetermined relationship criteria, and predetermined skillset criteria;

identifying, by one or more processors, at least one of a plurality of individuals associated with the at least one important skill set, using at least two or more social media platforms, wherein the at least two or more social media platforms are Internet-based applications that contain content generated by a respective user of the at least two or more social media platforms, wherein: (i) the content generated contains text data across the at least two or more social media platforms, and (ii) each of the at least two or more social media platforms contain respective attributes that are disparate from each other;

obtaining, by one or more processors, a set of attributes from a first social media platform of the at least two or more social media platforms and a set of attributes from a second social media platform of the at least two or more social media platforms;

identifying, by one or more processors, a level of the at least one important skill set of the at least one of the plurality of individuals associated with the at least one important skill set and a level of the relationship of the at least one of the plurality of individuals associated with the at least one important skill set, to the requester, wherein the level of the at least one important skill of the at least one of the plurality of individuals associated with the at least one important skill set and the level of the relationship of the at least one of the plurality of individuals associated with the at least one important skill set to the requesters are based on the determined patterns and trends from the obtained set of attributes from the first social media platform and the second social media platform of the two or more social media platforms;

gathering, by one or more processors, contradicting attribute values from the obtained set of attributes from the first social media platform and the second social media platform by weighing the gathered contradicting attribute values according to the predetermined relationship criteria and a predetermined skill set criteria;

determining, by one or more processors, patterns and trends from the obtained set of attributes from the first social platform and the second social media platform of the one or more social media platforms by combining the text data across the first social media platform and the second social media platform; and responsive to gathering the contradicting attributes from the obtained set of attributes from the first social media platform and the second social media platform, generating, by one or more processors, a ranking of the plurality of individuals associated with the at least one important skill set based on: (i) attributes present in the first social media platform yet absent in the second social media platform, (ii) the predetermined relationship criteria, (iii) the predetermined skill set criteria, and (iv) the query.

2. The method of claim 1, wherein the ranking of the plurality of individuals, comprises:
a percentage that is greater than or equal to 0 and less than or equal to 100, based on the predetermined relationship criteria; and
a percentage that is greater than or equal to 0 and less than or equal to 100, based on the predetermined skill set criteria.

3. The method of claim 1, wherein receiving the query from the requester, comprises:
receiving, by one or more processors, preferences for the first social media platform over the second social media platform; and
receiving, by one or more processors, a set of preferences of the requester, associated with the level of the at least one important skill set and the level of relationship of the at least one of the plurality of individuals associated with the at least one important skill set to the requester.

4. The method of claim 1, wherein identifying at least one of a plurality of individuals associated with the at least one important skill set, comprises:
associating, by one or more processors, at least part of the text data across the two or more social media platforms with the obtained set of attributes from the first social media platform and the second social media platform.

5. The method of claim 1, wherein identifying the level of relationship of the at least one of the plurality of individuals associated with the at least one important skill set to the requester, comprises:
associating, by one or more processors, at least part of the text data across the two or more social media platforms with the obtained set of attributes from the first social media platform and the second social media platform.

6. The method of claim 1, wherein generating a ranking of the plurality of individuals associated with the at least one important skill, comprises:
associating, by one or more processors, information found from the at least two or more social media platforms, with a first profile;
grouping, by one or more processors, the information found from the at least two or more social media platforms associated with the at least one important skill set within the first profile; and
grouping, by one or more processors, the information found from the at least two or more social media platforms associated with the level of relationship of the plurality of individuals associated with the at least one important skill set to the requester, within the first profile.

7. The method of claim 1 further comprising:
receiving, by one or more processors, a number of search results associated with the query based on the plurality of preferences of the requester; and
receiving, by one or more processors, a number of the rankings of the plurality of individuals associated with the at least one important skill set, based on the predetermined relationship criteria and the predetermined skill set criteria, associated with the query.

8. A computer program product for locating individuals in a field, the computer program product comprising:
a computer readable storage medium and program instructions stored on the computer readable storage medium, the program instructions comprising:
program instructions to receive a query, wherein the query comprises at least one important skill set;
program instructions to associate the query with a plurality of preferences of the requester, a predetermined relationship criteria, and predetermined skillset criteria;
program instructions to identify at least one of a plurality of individuals associated with the at least one important skill set, using at least two or more social media platforms, wherein the at least two or more social media platforms are Internet-based applications that contain content generated by a respective user of the at least two or more social media platforms, wherein: (i) the content generated contains text data across the at least two or more social media platforms, and (ii) each of the at least two or more social media platforms contain respective attributes that are disparate from each other;
program instructions to obtain a set of attributes from a first social media platform of the at least two or more social media platforms and a set of attributes from a second social media platform of the at least two or more social media platforms;
program instructions to identify a level of the at least one important skill set of the at least one of the plurality of individuals associated with the at least one important skill set and a level of the relationship of the at least one of the plurality of individuals associated with the at least one important skill set to the requester, wherein the level of the at least one important skill of the at least one of the plurality of individuals associated with the at least one important skill set and the level of the relationship of the at least one of the plurality of individuals associated with the at least one important skill set to the requesters are based on the determined patterns and trends from the obtained set of attributes from the first social media platform and the second social media platform of the two or more social media platforms;
program instructions to gather contradicting attribute values from the obtained set of attributes from the first social media platform and the second social media platform by weighing the gathered contradicting attribute values according to the predetermined relationship criteria and a predetermined skill set criteria;
program instructions to determine patterns and trends from the obtained set of attributes from the first social platform and the second social media platform of the one or more social media platforms by combining the text data across the first social media platform and the second social media platform; and responsive to gathering the contradicting attributes from the obtained set of attributes from the first social media platform and the second social media platform, program instructions to generate a ranking of the plurality of individuals associated with the at least one important skill set based on: (i) attributes present in the first social media platform yet absent in the second social media platform, (ii) the predetermined relationship criteria, (iii) the predetermined skill set criteria, and (iv) the query.

9. The computer program product of claim 8, wherein the ranking of the plurality of individuals, comprises:
a percentage that is greater than or equal to 0 and less than or equal to 100, based on the predetermined relationship criteria; and
a percentage that is greater than or equal to 0 and less than or equal to 100, based on the predetermined skill set criteria.

10. The computer program product of claim 8, wherein program instructions to receive the query comprise:
program instructions to receive preferences for the first social media platform over the second social media platform; and
program instructions to receive a set of preferences of the requester associated with the level of the at least one important skill set and the level of relationship of the at least one of the plurality of individuals associated with the at least one important skill set to the requester.

11. The computer program product of claim 8, wherein program instructions to identify at least one of a plurality of individuals associated with the at least one important skill set, comprise:
program instructions to associate at least part of the text data across the two or more social media platforms with the obtained set of attributes from the first social media platform and the second social media platform.

12. The computer program product of claim 8, wherein program instructions to identify the level of relationship of the at least one of the plurality of individuals associated with the at least one important skill set to the requester, comprise:
program instructions to associate at least part of the text data across the two or more social media platforms with the obtained set of attributes from the first social media platform and the second social media platform.

13. The computer program product of claim 8, wherein program instructions to generate a ranking of the plurality of individuals associated with the at least one important skill, comprise:
program instructions to associate information found from the at least two or more social media platforms, with a first profile;
program instructions to group the information found from the at least two or more social media platforms associated with the at least one important skill set within the first profile; and
program instructions to group the information found from the at least two or more social media platforms associated with the level of relationship of the plurality of individuals associated with the at least one important skill set to the requester within the first profile.

14. The computer program product of claim 8, further comprising:
program instructions to receive a number of search results associated with the query based on the plurality of preferences of the requester; and
program instructions to receive a number of the ranking of the plurality of individuals associated with the at least one important skill set, based on the predetermined relationship criteria and the predetermined skill set criteria, associated with the query.

15. A computer system for locating individuals in a field, the computer system comprising:
one or more computer processors;
one or more computer readable storage media;
program instructions stored on the one or more computer readable storage media for execution by at least one of the one or more processors, the program instructions comprising:
program instructions to receive a query, wherein the query comprises at least one important skill set;
program instructions to associate the query with a plurality of preferences of the requester, a predetermined relationship criteria, and predetermined skillset criteria;
program instructions to identify at least one of a plurality of individuals associated with the at least one important skill set, using at least two or more social media platforms, wherein the at least two or more social media platforms are Internet-based applications that contain content generated by a respective user of the at least two or more social media platforms, wherein: (i) the content generated contains text data across the at least two or more social media platforms, and (ii) each of the at least two or more social media platforms contain respective attributes that are disparate from each other;
program instructions to obtain a set of attributes from a first social media platform of the at least two or more social media platforms and a set of attributes from a second social media platform of the at least two or more social media platforms;
program instructions to identify a level of the at least one important skill set of the at least one of the plurality of individuals associated with the at least one important skill set and a level of the relationship of the at least one of the plurality of individuals associated with the at least one important skill set to the requester, wherein the level of the at least one important skill of the at least one of the plurality of individuals associated with the at least one important skill set and the level of the relationship of the at least one of the plurality of individuals associated with the at least one important skill set to the requesters are based on the determined patterns and trends from the obtained set of attributes from the first social media platform and the second social media platform of the two or more social media platforms;
program instructions to gather contradicting attribute values from the obtained set of attributes from the first social media platform and the second social media platform by weighing the gathered contradicting attribute values according to the predetermined relationship criteria and a predetermined skill set criteria;
program instructions to determine patterns and trends from the obtained set of attributes from the first social platform and the second social media platform of the one or more social media platforms by combining the text data across the first social media platform and the second social media platform; and
responsive to gathering the contradicting attributes from the obtained set of attributes from the first social media platform and the second social media platform, program instructions to generate a ranking of the plurality of individuals associated with the at least one important skill set based on: (i) attributes present in the first social media platform yet absent in the second social media platform, (ii) the predetermined relationship criteria, (iii) the predetermined skill set criteria, and (iv) the query.

16. The computer system of claim 15, wherein the ranking of the plurality of individuals, comprises:
    a percentage that is greater than or equal to 0 and less than or equal to 100, based on the predetermined relationship criteria; and
    a percentage that is greater than or equal to 0 and less than or equal to 100, based on the predetermined skill set criteria.

17. The computer system of claim 15, wherein program instructions to receive the query comprise:
    program instructions to receive preferences for the first social media platform over the second social media platform; and
    program instructions to receive a set of preferences of the requester associated with the level of the at least one important skill set and the level of relationship of the at least one of the plurality of individuals associated with the at least one important skill set to the requester.

18. The computer system of claim 15, wherein program instructions to identify at least one of a plurality of individuals associated with the at least one important skill set, comprise:
    program instructions to associate at least part of the text data across the two or more social media platforms with the obtained set of attributes from the first social media platform and the second social media platform.

19. The computer system of claim 15, wherein program instructions to identify the level of relationship of the at least one of the plurality of individuals associated with the at least one important skill set to the requester, comprise:
    program instructions to associate at least part of the text data and the table data across the two or more social media platforms with the obtained set of attributes from the first social media platform and the second social media platform.

20. The computer system of claim 15, wherein program instructions to generate a ranking of the plurality of individuals associated with the at least one important skill, comprise:
    program instructions to associate information found from the at least two or more social media platforms, with a first profile;
    program instructions to group the information found from the at least two or more social media platforms associated with the at least one important skill set within the first profile; and
    program instructions to group the information found from the at least two or more social media platforms associated with the level of relationship of the plurality of individuals associated with the at least one important skill set to the requester within the first profile.

* * * * *